US 9,695,891 B2

(12) United States Patent
Kirkpatrick

(10) Patent No.: US 9,695,891 B2
(45) Date of Patent: Jul. 4, 2017

(54) DAMPER BRAKE

(71) Applicant: Goodrich Corporation, Charlotte, NC (US)

(72) Inventor: Christopher T. Kirkpatrick, Pueblo West, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 65 days.

(21) Appl. No.: 14/943,878

(22) Filed: Nov. 17, 2015

(65) Prior Publication Data
US 2017/0138423 A1 May 18, 2017

(51) Int. Cl.
F16D 65/00 (2006.01)
F16D 55/36 (2006.01)
F16D 65/12 (2006.01)
B64C 25/42 (2006.01)

(52) U.S. Cl.
CPC .......... F16D 65/0006 (2013.01); B64C 25/42 (2013.01); F16D 55/36 (2013.01); F16D 65/12 (2013.01)

(58) Field of Classification Search
CPC ...... F16D 65/0006; F16D 55/36; F16D 65/12; F16D 2065/132; F16D 2065/1372; F16D 2055/0058; F16D 13/64; F16D 13/648; F16D 2300/22; F16D 2300/10; B64C 25/42
USPC ...................................... 188/71.5
See application file for complete search history.

(56) References Cited

U.S. PATENT DOCUMENTS

| 4,585,096 | A | * | 4/1986 | Bok | F16C 13/648 188/71.5 |
| 5,255,761 | A | * | 10/1993 | Zaremsky | B60T 1/065 188/18 A |
| 5,855,257 | A | | 1/1999 | Wickert et al. | |
| 7,523,816 | B2 | | 4/2009 | Tong et al. | |
| 7,546,910 | B2 | | 6/2009 | Thorp et al. | |
| 8,020,943 | B2 | | 9/2011 | Kipp et al. | |
| 8,281,907 | B2 | * | 10/2012 | Fryska | F16D 65/12 188/218 A |
| 8,573,369 | B2 | * | 11/2013 | Scelsi | F16D 55/36 188/18 A |
| 9,091,313 | B2 | | 7/2015 | Chelaidite et al. | |
| 9,366,302 | B1 | * | 6/2016 | Kirkpatrick | F16D 65/12 |
| 9,482,299 | B1 | * | 11/2016 | Kirkpatrick | F16D 65/12 |
| 2012/0091666 | A1 | | 4/2012 | Chelaidite et al. | |
| 2012/0248855 | A1 | | 10/2012 | Shamo | |
| 2014/0174863 | A1 | * | 6/2014 | Kirkpatrick | F16D 55/36 188/218 XL |
| 2015/0001008 | A1 | * | 1/2015 | Kirkpatrick | B64C 25/42 188/71.5 |
| 2015/0001017 | A1 | * | 1/2015 | Kirkpatrick | F16D 65/12 188/218 XL |
| 2015/0129369 | A1 | * | 5/2015 | Kirkpatrick | F16D 65/12 188/71.5 |

(Continued)

FOREIGN PATENT DOCUMENTS

EP 2397719 4/2013

Primary Examiner — Thomas J Williams
Assistant Examiner — Mariano Sy
(74) Attorney, Agent, or Firm — Snell & Wilmer L.L.P.

(57) ABSTRACT

Disclosed is a disk damping core for a disk brake assembly comprising at least two disk leaves comprising mating sloped contact surfaces configured to provide additional energy damping.

18 Claims, 11 Drawing Sheets

(56) References Cited

U.S. PATENT DOCUMENTS

2016/0215838 A1* 7/2016 Kirkpatrick ........... F16D 65/127
2016/0304191 A1* 10/2016 Sheehan ................. F16D 55/36

* cited by examiner

DAMPER BRAKE

BACKGROUND

Aircraft brake systems typically employ a series of friction disks that, when forced into contact with each other, help to stop the aircraft. Friction disks splined to a non-rotating wheel axle are interspersed with friction disks splined to the rotating wheel. The friction disks are configured to withstand and dissipate the heat generated from contact between the friction disks during braking. Due to high speed landings and/or rejected takeoffs, over time, the amount of heat generated can be enough to destroy friction disks made of formerly commonly used materials, such as steel. Carbon composite materials are better suited for high temperature use and are now the standard for friction disks in aircraft brake assemblies. However, carbon composite disks may vibrate in use and may generate brake noise.

SUMMARY

In accordance with various embodiments, disclosed is a disk damping core comprising: a first disk leaf having at least one first sloped contact surface and at least one first non-contact surface positioned adjacent the at least one first sloped contact surface; and a second disk leaf having at least one second sloped contact surface and at least one second non-contact surface positioned adjacent the at least one second sloped contact surface, the first disk leaf and the second disk leaf being configured such that a gap is formed between the at least one first non-contact surface and the at least one second non-contact surface when the at least one first sloped surface is in contact with the at least one second sloped surface, wherein the at least one first sloped contact surface is formed in the first disk leaf as manufactured, and wherein the at least one second sloped contact surface is formed in the second disk leaf as manufactured. In one embodiment, the at least one first sloped contact surface is inclined at a first angle of between 10 degrees and 45 degrees with respect to a planar surface component of the first disk leaf, and the at least one second sloped contact surface of the second disk leaf is inclined at a second angle of between 10 degrees and 45 degrees with respect to a planar surface component of the second disk leaf, wherein the first angle equals the second angle. In one embodiment, the first sloped contact surface is repeated at varying radial positions on the first disk leaf. In one embodiment, the gap formed between the at least one first non-contact surface and the at least one second non-contact is between about 0.015 cm and 0.25 cm. In one embodiment, the first disk leaf comprises at least two sloped contact surfaces, which are inclined in opposite directions with respect to a planar surface component of the first disk leaf, wherein the at least one first non-contact surface of the first disk leaf is parallel with respect to the planar surface component of the first disk leaf, and wherein the at least two sloped contact surfaces and the at least one first non-contact surface form at least one of a trench or peak within the first disk leaf, wherein the second disk leaf comprises at least two sloped contact surfaces, which are inclined in opposite directions with respect to a planar surface component of the second disk leaf, wherein the at least one second non-contact surface of the second disk leaf is parallel with respect to the planar surface component of the second disk leaf, and wherein the at least two sloped contact surfaces and the at least one non-contact surface form at least one of a trench or peak within the second disk leaf, and wherein the at least one of a trench or peak within the first disk leaf is configured to at least partially contact in mating alignment with at least one of a trench or peak within the second disk leaf. In one embodiment, the at least one of a trench or peak within the first disk leaf extend circumferentially at least around a portion of the first disk leaf. In one embodiment, the first disk leaf comprising at least one trench and at least one peak, the second disk leaf comprising at least one trench and at least one peak, wherein the at least one trench of the first disk leaf is in mating alignment with the at least one peak of the second disk leaf, and wherein the at least one peak of the first disk leaf is in mating alignment with the at least one peak of the second disk leaf. In one embodiment, the first disk leaf comprising multiple trenches and multiple peaks, and the second disk leaf comprising multiple trenches and multiple peaks. In one embodiment, the at least two disk leaves comprise a carbon composite material.

In accordance with various embodiments, disclosed is a disk brake assembly comprising: a pressure plate coupled to a first rotor friction disk of a plurality of rotor friction disks; and a plurality of stator friction disks located between the pressure plate and an end plate, wherein at least one stator friction disk comprises a disk damping core comprising at least two disk leaves comprising a first disk leaf and a second disk leaf, the first disk leaf having at least one first sloped contact surface formed in the first disk leaf as manufactured, and the second disk leaf having at least one second sloped contact surface formed in the second disk leaf as manufactured. In one embodiment, each one of the plurality of stator friction disks is disposed alternately with each one of the plurality of rotor friction disks along an axis, and wherein at least one of the plurality of rotor friction disks and the plurality of stator friction disks comprises a solid friction disk, and wherein the end plate is coupled to a second rotor friction disk of the plurality of rotor friction disks. In one embodiment, the disk damping core further comprises a floating core. In one embodiment, the disk damping core further comprises at least one cavity formed between two disk leaves. In one embodiment, the disk damping core further comprises at least one spacer. In one embodiment, the disk damping core further comprising at least one non-contact surface adjacent the at least one first sloped contact surface of the first disk leaf; and at least one non-contact surface adjacent the at least one second sloped contact surface of the second disk leaf, wherein contact between the at least one first sloped contact surface of the first disk leaf and the at least one second sloped contact surface of the second disk leaf creates a gap between the at least one non-contact surface of the first disk leaf and the at least one non-contact surface of the second disk leaf.

In accordance with various embodiments, disclosed is a first disk half having a first friction surface at a first axial end of the first disk half and a first non-friction surface at a second axial end of the first disk half; a second disk half having a second friction surface at a third axial end of the second disk half and a second non-friction surface at a fourth axial end of the second disk half, wherein the first friction surface is disposed at a fifth axial end of the multi-leaved core damping disk and the second friction surface is disposed at a sixth axial end of the multi-leaved core damping disk; and a multi-leaved core disposed between, and axially aligned with, the first disk half and the second disk half, the multi-leaved core comprising at least two disk leaves comprising a first disk leaf and a second disk leaf; the first disk leaf comprising at least one first sloped contact surface and at least one first non-contact surface positioned adjacent the at least one first sloped contact surface; and the second disk leaf comprising at least one second sloped contact surface and at least one second non-contact surface positioned adjacent the at least one second sloped contact surface, the first disk leaf and the second disk leaf being configured such that a gap is formed between the at least one first non-contact surface and the at least one second non-contact surface when the at least one first sloped surface is in contact with the at least one second sloped surface, wherein the at least one first sloped contact surface is formed in the first disk leaf as manufactured, and wherein the at least one second sloped contact surface is formed in the second disk leaf as manufactured. In one embodiment, the at least one first non-contact surface of the first disk leaf is perpendicular to an axis of the multi-leaved core. In one embodiment, the at least one first non-contact surface of the first disk leaf is parallel to an axis of the multi-leaved core. In one embodiment, the first disk leaf comprises at least two sloped contact surfaces, which are inclined in opposite directions with respect to a planar surface component of the first disk leaf, the planar surface component being perpendicular to an axis of the multi leaved core, wherein the at least one first non-contact surface of the first disk leaf is parallel with respect to the planar surface component of the first disk leaf, and wherein the at least two sloped contact surfaces and the at least one first non-contact surface form at least one of a trench or peak within the first disk leaf, wherein the second disk leaf comprises at least two sloped contact surfaces, which are inclined in opposite directions with respect to the planar surface component of the first disk leaf, wherein the at least one second non-contact surface of the second disk leaf is parallel with respect to the planar surface component of the first disk leaf, and wherein the at least two sloped contact surfaces and the at least one second non-contact surface form at least one of a trench or peak within the second disk leaf, and wherein the at least one of a trench or peak within the first disk leaf is configured to mate with at least one of a trench or peak within the second disk leaf. In one embodiment, the at least two disk leaves comprise a carbon composite material.

BRIEF DESCRIPTION OF THE DRAWINGS

The drawings described herein are for illustration purposes only and are not intended to limit the scope of the present disclosure in any way. The present disclosure will become more fully understood from the detailed description and the accompanying drawings wherein.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

The present disclosure relates to aircraft braking systems and, more particularly, to a vibration damping brake disk of an aircraft brake assembly.

Figure 1:
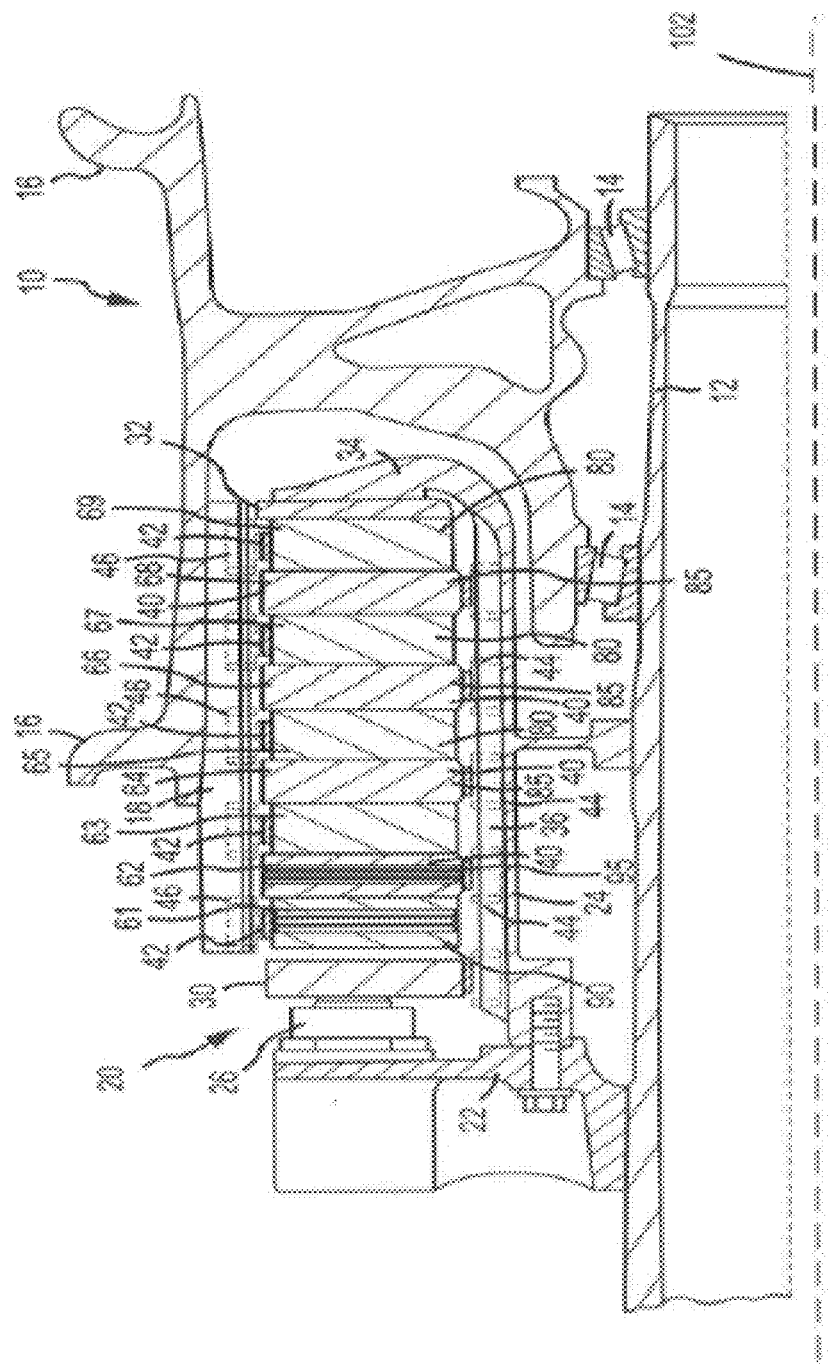
FIG. 1 illustrates a partial cross-sectional view of a disk brake assembly in accordance with various embodiments.

According to various embodiments, and with reference to FIG. 1, a cross-sectional view of a wheel 10 supported for rotation around axle 12 by bearings 14 is depicted. In various embodiments, wheel 10 includes rims 16 for supporting a tire and a series of axially extending rotor splines 18 (one shown). In various embodiments, rotation of wheel 10 is modulated by disk brake assembly 20. In various embodiments, disk brake assembly 20 includes torque flange 22, torque tube 24, a plurality of pistons 26 (one shown), pressure carbon disk 30, and end plate 32. In various embodiments, torque tube 24 is an elongated annular structure that includes reaction plate 34 and a series of axially extending stator splines 36 (one shown). In various embodiments, reaction plate 34 and stator splines 36 may be integral with torque tube 24 as shown in FIG. 1, or attached as separate components.

In various embodiments, disk brake assembly 20 also includes at least one multi-leaved core damping disk (also referred to as "core damping disk") and at least one solid friction disk (and/or solid friction disk assembly). In various embodiments, multi-leaved core damping disks 90, 95 may be a non-rotatable friction disk 40, or a rotatable friction disk 42. In various embodiments, solid friction disks 80, 85 may be a non-rotatable friction disk 40, or a rotatable friction disk 42. In various embodiments, solid friction disks 80, 85 may comprise a continuous or unitary annular-shaped disk. As used herein, a non-rotatable friction disk 40 (such as disks 85, 95) may be referred to as a stator friction disk. At times a rotatable friction disk 42 (such as disks 80, 90) may be referred to as a rotor friction disk. In various embodiments, each one of multi-leaved core damping disks 90, 95 and/or solid friction disks 80, 85 includes an attachment structure. In various embodiments, non-rotatable friction disk 40 may include a plurality of stator lugs 44 at circumferentially spaced positions around non-rotatable friction disk 40 as an attachment structure. Similarly, in various embodiments, rotatable friction disk 42 may include a plurality of rotor lugs 46 at circumferentially spaced positions around rotatable friction disk 42 at an attachment structure. The disk brake assemblies contemplated herein may have any number of rotatable friction disks and/or non-rotatable friction disks, such as 5,4; 4,3; and 3,2, respectively. For convenience, the friction disk positions referred to herein are labeled 61, 62, 63, 64, 65, 66, 67, 68, and 69 from the pressure carbon disk 30 to the end plate 32. For instance, position 61 is adjacent to the pressure carbon disk 30 while position 69 is adjacent to the end plate 32. In various embodiments, pressure carbon disk 30, end plate 32, solid friction disks 80, 85 and multi-leaved core damping disks 90, 95 are all generally annular structures comprising a carbon composite material.

In various embodiments, torque flange 22 is mounted to axle 12. In various embodiments, torque tube 24 is bolted to torque flange 22 such that reaction plate 34 is near an axial center of wheel 10. In various embodiments, end plate 32 is connected to a surface of reaction plate 34 facing axially away from the axial center of wheel 10. Thus, in various embodiments, end plate 32 is non-rotatable by virtue of its connection to torque tube 24. In various embodiments, stator splines 36 support pressure carbon disk 30 so that pressure carbon disk 30 is also non-rotatable. In various embodiments, stator splines 36 also support non-rotatable friction disks 40. In various embodiments, non-rotatable friction disks 40 engage stator splines 36 with gaps formed between stator lugs 44. Similarly, in various embodiments, rotatable friction disks 42 engage rotor splines 18 with gaps formed between rotor lugs 46. Thus, in various embodiments, rotatable friction disks 42 are rotatable by virtue of their engagement with rotor splines 18 of wheel 10.

As shown in FIG. 1, in various embodiments, rotatable friction disks 42 are arranged with end plate 32 on one end, pressure carbon disk 30 on the other end, and non-rotatable friction disks 40 interleaved so that rotatable friction disks 42 are adjacent to non-rotatable friction components. In various embodiments, pistons 26 are connected to torque flange 22 at circumferentially spaced positions around torque flange 22. In various embodiments, pistons 26 face axially toward wheel 10 and contact a side of pressure carbon disk 30 opposite rotatable friction disks 42. In various embodiments, pistons 26 may be powered electrically, hydraulically, pneumatically and/or combinations thereof.

Figure 2:
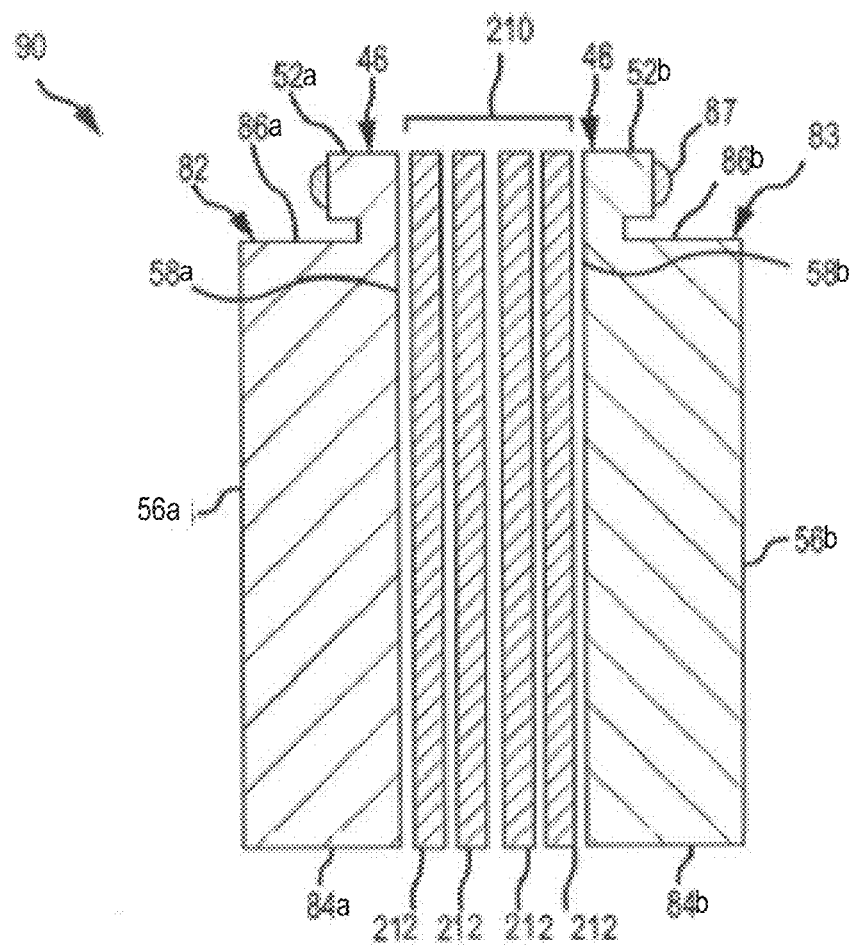
FIG. 2 illustrates a partial cross-sectional view of a multi-leaved core damping disk in accordance with various embodiments.

With reference to FIG. 2, a cross-sectional view of multi-leaved core damping disk 90, which is shown in FIG. 1 as rotatable friction disk 42, is depicted. In various embodiments, multi-leaved core damping disk 90 comprises a first disk half 82 and a second disk half 83. In various embodiments, first disk half 82 and second disk half 83 may comprise annular-shaped disks. In various embodiments, first disk half 82 and second disk half 83 may comprise an attachment structure in the form of rotor lug 46, friction surfaces 56a and 56b, and non-friction surfaces 58a and 58b. In various embodiments, friction surface 56 may be disposed at an axial end of first disk half 82 and second disk half 83. In various embodiments, friction surface 56 may be configured for operationally engaging a corresponding friction surface of another disk brake assembly component, such as a non-rotatable friction disk 40. In various embodiments, non-friction surface 58 may be located at an axial end of first disk half 82 and second disk half 83 on a side opposite of friction surface 56. In various embodiments, non-friction surface 58 may be configured for contacting a non-friction surface of another disk brake assembly component.

In various embodiments, first disk half 82 and second disk half 83 further comprise inner diameter surfaces 84a and 84b and outer diameter surfaces 86a and 86b and outer attachment surfaces 52a and 52b. In various embodiments, inner diameter surface 84 may be located at a radially inward facing edge of first disk half 82 and second disk half 83. In various embodiments, outer diameter surface 86 and outer attachment surface 52 may be located at a radially outward facing edge of first disk half 82 and second disk half 83. In various embodiments, friction surface 56 may extend radially between inner diameter surface 84 and outer diameter surface 86. In various embodiments, non-friction surface 58 may extend radially between inner diameter surface 84 and outer attachment surface 52.

In various embodiments, first disk half 82 and second disk half 83 may comprise an attachment structure in the form of rotor lug 46. In various embodiments, rotor lug 46 may project radially outward from outer diameter surface 86. As shown in FIG. 2, in various embodiments, multi-leaved core 210 may be disposed between first disk half 82 and second disk half 83 such that their respective non-friction surfaces 58 are in contact with multi-leaved core 210 to form multi-leaved core damping disk 90. In various embodiments, multi-leaved core 210 may comprise at least two disk leaves 212.

In various embodiments, first disk half 82 and second disk half 83 may be coupled by a fastening device 87. In various embodiments, fastening device 87 may comprise a rivet, spring-loaded rivet, clamp, or other suitable assembly hardware. However, in various embodiments, fastening device 87 may comprise any attachment mechanism suitable for use in multi-leaved core damping disk 90. In various embodiments, while the first disk half 82 and second disk half 83 may be held in contact with multi-leaved core 210, they may form a non-continuous structure. That is, the non-friction surfaces 58 are not bonded to multi-leaved core 210, but are held together by, for example, fastening device 87. In various embodiments, first disk half 82 and second disk half 83 may be coupled by a plurality of fastening devices disposed circumferentially about multi-leaved core damping disk.

In various embodiments, disk leaves 212 may comprise thin, generally annular-shaped disks. In various embodiments, disk leaves 212 may be oriented about axis 102 (with momentary reference to FIG. 1) and disposed substantially parallel to first disk half 82 and second disk half 83. As shown in FIG. 2, in various embodiments, multi-leaved core 210 may comprise four disk leaves 212. In various embodiments, multi-leaved core 210 may comprise two disk leaves 212. However, a multi-leaved core may comprise any number of disk leaves suitable for a particular embodiment. In various embodiments, disk leaf 212 may comprise an axial thickness of between about 1.27 millimeters (about 0.05 inches) and about 15.24 millimeters (about 0.6 inches), wherein the term about in this context only refers to +/−0.635 millimeters (about 0.025 inches). In various embodiments, disk leaf 212 may have a varying axial thickness. For example, disk leaf 212 may include recesses and projections. However, in various embodiments, disk leaf 212 may comprise any suitable axial thickness.

In various embodiments, disk leaves 212 may comprise at least one of a carbon composite material, a refractory metal, or a refractory metal alloy. For example, in various embodiments, disk leaves 212 may comprise at least one of carbon, silicon carbide, silicon nitride, boron carbide, aluminum nitride, titanium nitride, boron nitride, zirconia, SiCxNy (wherein x is a number in the range from about zero to about 1, and y is a number in the range from about zero to about 4/3), silica, alumina, titania (TiO2), or a combination of at least two of the foregoing. However, in various embodiments, disk leaves 212 may comprise any suitable material capable of withstanding operational temperatures of a disk brake assembly.

Although the embodiment of FIG. 2 is described in terms of multi-leaved core damping disk 90, which is a rotatable friction disk 42 (with momentary reference to FIG. 1), it is understood that the same description and features apply generally to either type of multi-leaved core damping disk 90, 95 and thus, to a non-rotatable friction disk 40 (with momentary reference to FIG. 1), except that rotor lug 46 at outer diameter surface 86 is replaced by stator lug 44 at inner diameter surface 84.

With reference to FIGS. 1 and 2, in various embodiments, prior to operation of disk brake assembly 20, pistons 26 are not actuated and gaps exist between each of rotatable friction disks 42 and each of the non-rotatable friction components, namely pressure carbon disk 30, end plate 32, and non-rotatable friction disks 40. In various embodiments, the gaps are formed by the axial spreading of the rotatable friction disks 42 along rotor splines 18; and the non-rotatable friction disks 40, and pressure carbon disk 30 along stator splines 36 due to the movement of rotatable friction disks 42 adjacent to the non-rotatable friction components. In various embodiments, during operation of disk brake assembly 20, pistons 26 are actuated, forcing pressure carbon disk 30 to move along stator splines 36 against at least one of a plurality of multi-leaved core damping disks 90 and/or solid friction disks 80, forcing them axially toward end plate 32 and reaction plate 34. In various embodiments, squeezed between pressure carbon disk 30 and reaction plate 34, the gaps are eliminated as friction surfaces contact other, mating friction surfaces. In various embodiments, drag generated by the contact of the friction surfaces acts to slow rotatable friction disks 42 and wheel 10. In various embodiments, the drag also generates significant heat which is absorbed by multi-leaved core damping disks 90, 95 and/or solid friction disks 80, 85 of disk brake assembly 20.

In various embodiments, brake vibration is significantly damped by multi-leaved core damping disks 90, 95. In various embodiments, multi-leaved core damping disks 90, 95 are assembled such that non-friction surfaces therein are in physical contact, but do not form a continuous structure. Thus, in various embodiments, vibration is damped at non-friction surfaces, even though brake pressure is satisfactorily transmitted to and from all multi-leaved core damping disks 90, 95. Without wishing to be bound by theory, it is believed that the non-continuous structure of multi-leaved core damping disks causes increased absorption of vibrational energy.

In various embodiments, performance variation of the brake assembly/heat sink may be controlled through placement of one or more multi-leaved core damping disks 90, 95 in various locations within the brake assembly/heat sink. For instance, and with reference to FIG. 1, in various embodiments, one multi-leaved core damping disk may be disposed at any one of friction disk position 61, 62, 63, 64, 65, 66, 67, 68, or 69. In such an embodiment, the single multi-leaved core damping disk may be referred to as a "dead" disk and may provide damping for an entire disk brake assembly. In various embodiments, however, a multi-leaved core damping disk may be disposed at two or more of friction disk positions 61, 62, 63, 64, 65, 66, 67, 68, and/or 69.

Figure 3:
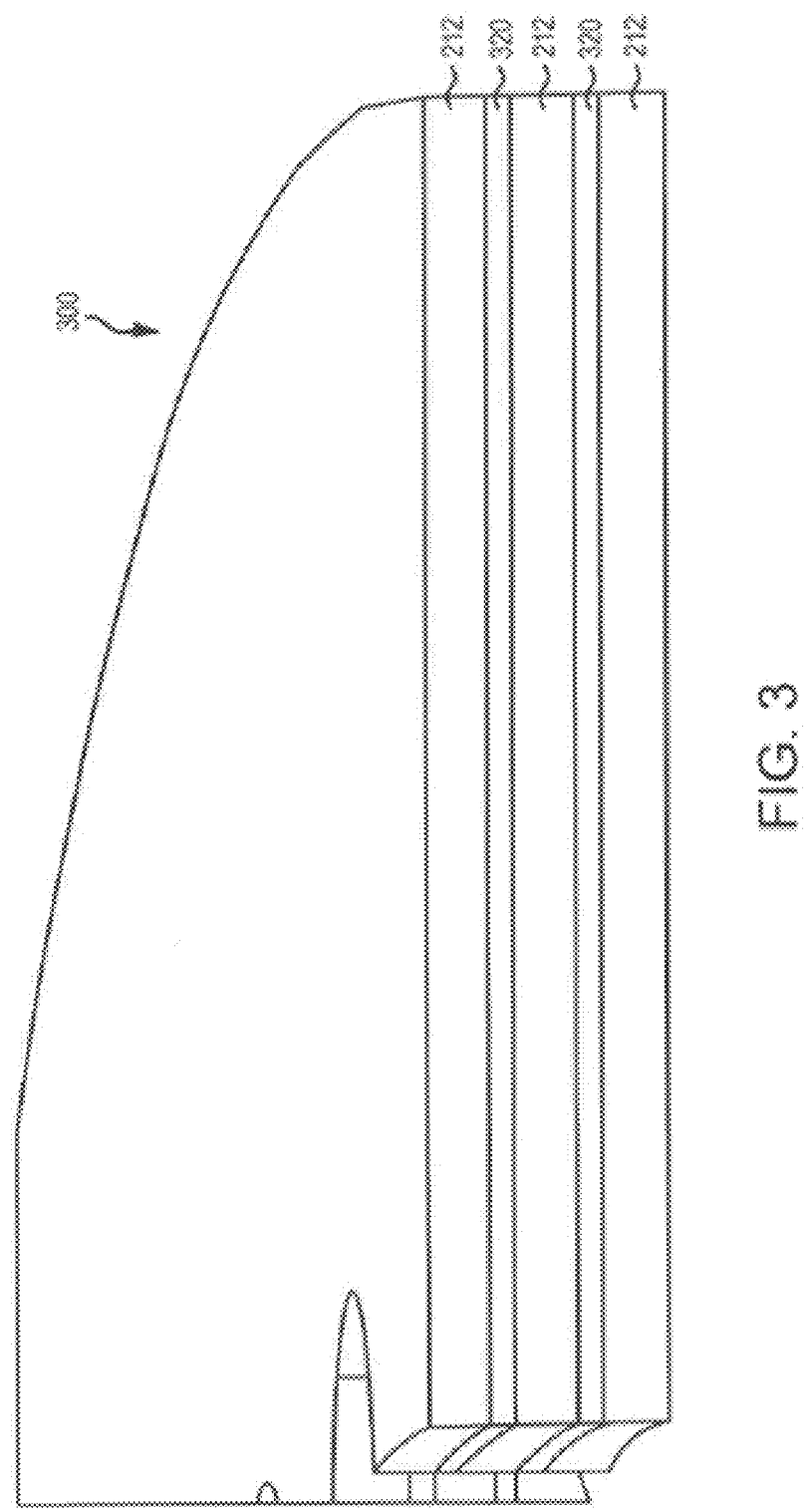
FIG. 3 illustrates a partial cut-away perspective view of a multi-leaved core in accordance with various embodiments.

In various embodiments a multi-leaved core damping disk may provide damping through additional features. With reference to FIG. 3, a multi-leaved core 300 may comprise a plurality of disk leaves 212. In various embodiments, multi-leaved core 300 may further comprise at least one spacer 320 interleaved between the plurality of disk leaves 212. In various embodiments, spacer 320 may comprise a carbon composite and/or carbon fiber-reinforced carbon, a composite material consisting of carbon fiber reinforcement in a matrix of graphite. In various embodiments, spacer 320 may comprise a metal and/or a refractory metal. In various embodiments, spacer 320 may comprise a different material than the plurality of disk leaves 212 and/or may comprise the same material as the plurality of disk leaves 212. In various embodiments, spacer 320 may provide additional damping.

Figure 4:
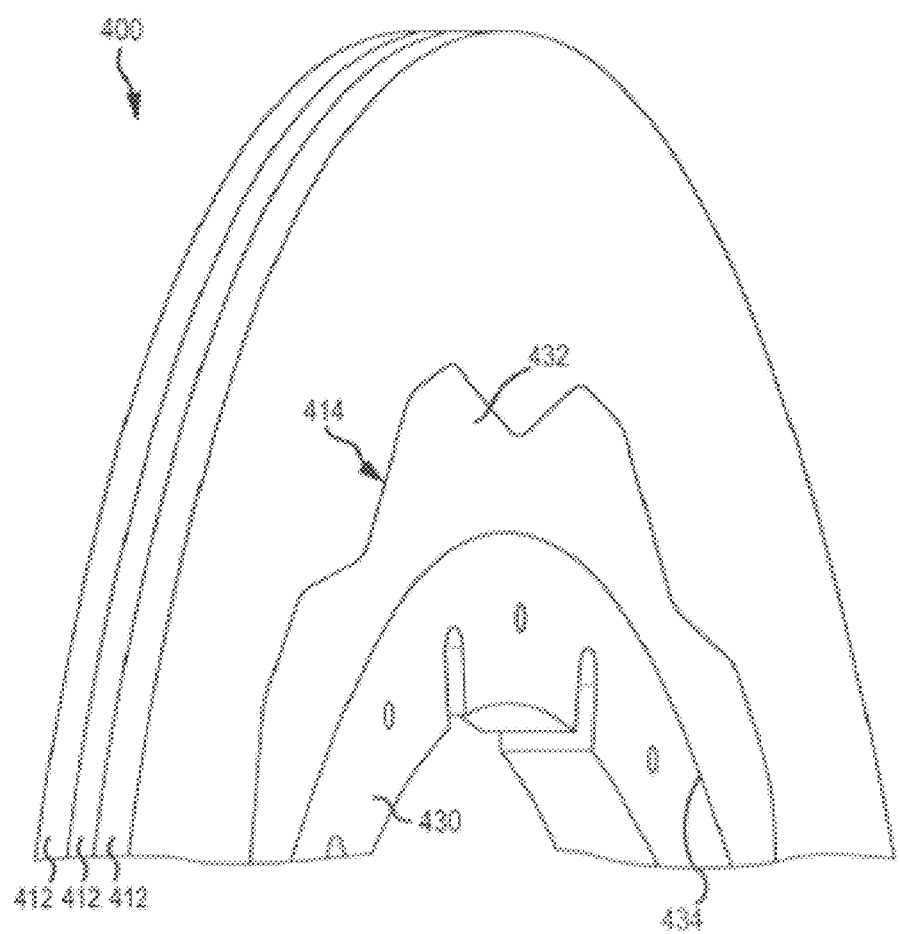
FIG. 4 illustrates a partial perspective view of a multi-leaved core in accordance with various embodiments.

In various embodiments, and with reference to FIG. 4, a multi-leaved core 400 may comprise a plurality of disk leaves 412 and a floating core 430. In various embodiments, floating core 430 may be located radially inward of disk leaves 412. In various embodiments, floating core 430 may comprise an annular component having floating core keys 432 extending radially outward from an outer circumference 434 of floating core 430. In various embodiments, each floating core key 432 may correspond to a plurality of disk leaf notches 414. In various embodiments, floating core 430 may be positioned such that floating core keys 432 fit within the plurality of disk leaf notches 414. Thus, in various embodiments, floating core keys 432 may contact lateral walls of the plurality of disk leaf notches 414 and prevent relative rotational movement between floating core 430 and the plurality of disk leaves 412. In various embodiments, a material of floating core 430 may be selected for its frictional and/or vibrational damping properties. In various embodiments, the material of floating core 430 may be selected for its wear resistance, thermal conductivity, heat capacity, structural, and/or oxidation resistance properties. In various embodiments, floating core 430 may comprise a carbon composite. In various embodiments, floating core 430 may provide additional damping.

Figure 5:
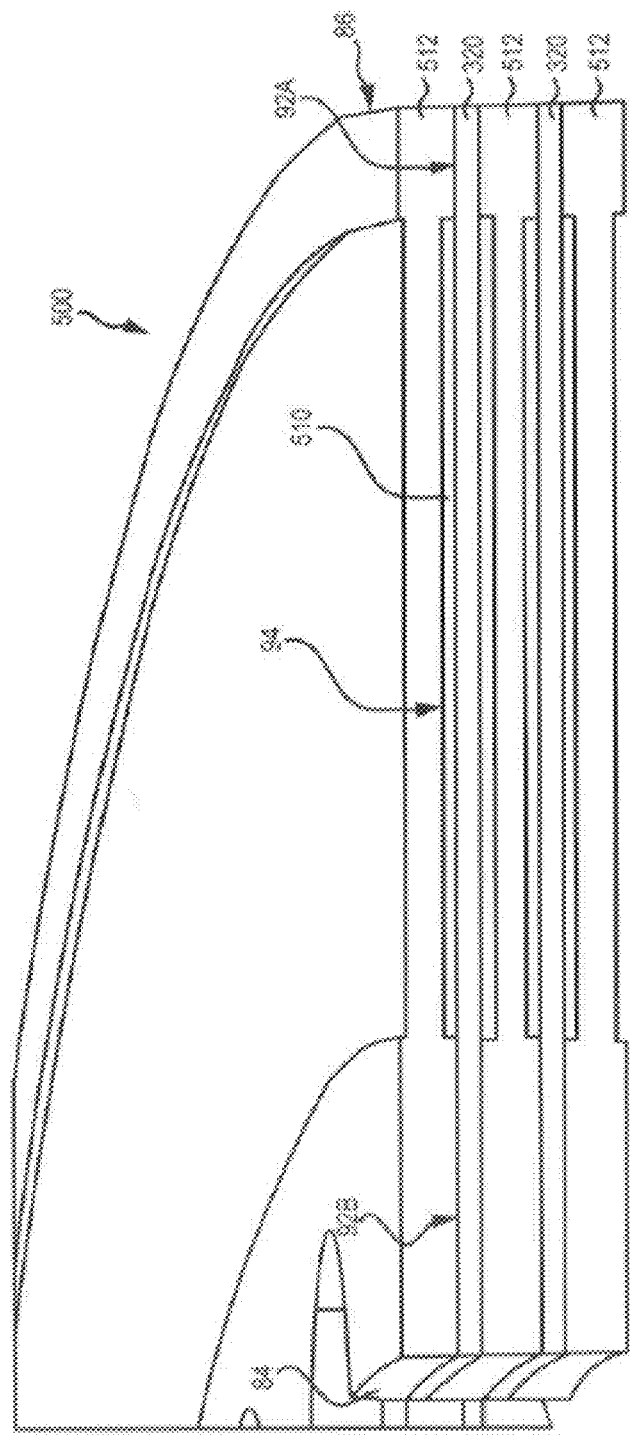
FIG. 5 illustrates a partial cut-away perspective view of a multi-leaved core in accordance with various embodiments.

In various embodiments, and with reference to FIG. 5, a multi-leaved core 500 may comprise at least one cavity 510 configured to provide additional damping. In various embodiments, at least one disk leaf 512 of multi-leaved core 500 may comprise at least one contact surface 92A, 92B and non-contact surface 94. In various embodiments, non-contact surface 94 may be recessed from contact surface 92A, and/or 92B. In various embodiments, contact surface 92B is substantially parallel to non-contact surface 94. In various embodiments, contact surface 92A, 92B may be configured for contacting a non-friction surface of another disk brake assembly component, for example, an adjacent disk leaf 512.

In various embodiments, non-contact surface 94 may extend radially at least partially between inner diameter surface 84 and outer diameter surface 86. In various embodiments, non-contact surface 94 extends circumferentially around at least a portion of disk leaf 512. In various embodiments, non-contact surface 94 extends circumferentially around the entirety of disk leaf 512 to form a complete annulus. According to various embodiments, the surface of the non-contact surface, may not be parallel to the contact surfaces of disk leaf 512 and, instead, may be oriented in any desired angle, and may comprise a curve or any desired shape.

In various embodiments, each of at least two disk leaves 512 may comprise a circumferentially extending recess on an axial side of the disk leaf 512. In various embodiments, the at least two disk leaves 512 may be disposed in multi-leaved core 500 such that their recesses face each other, forming a cavity 510. In various embodiments, disk leaves 512 are in physical contact with each other at contact surfaces 92A, 92B, but do not form a continuous structure. While not intending to be bound by theory, in various embodiments, this structural discontinuity at contact surfaces 92A, 92B may serve to damp vibration. In various embodiments, cavity 510 limits the area of contact between disk leaves 512, which may also damp vibration and/or reduce brake noise of a disk brake assembly. According to various embodiments, improved braking performance under certain conditions and decreased variability in braking performance may be achieved. In various embodiments, multi-leaved core 500 may further comprise at least one spacer 320.

Figure 6A:
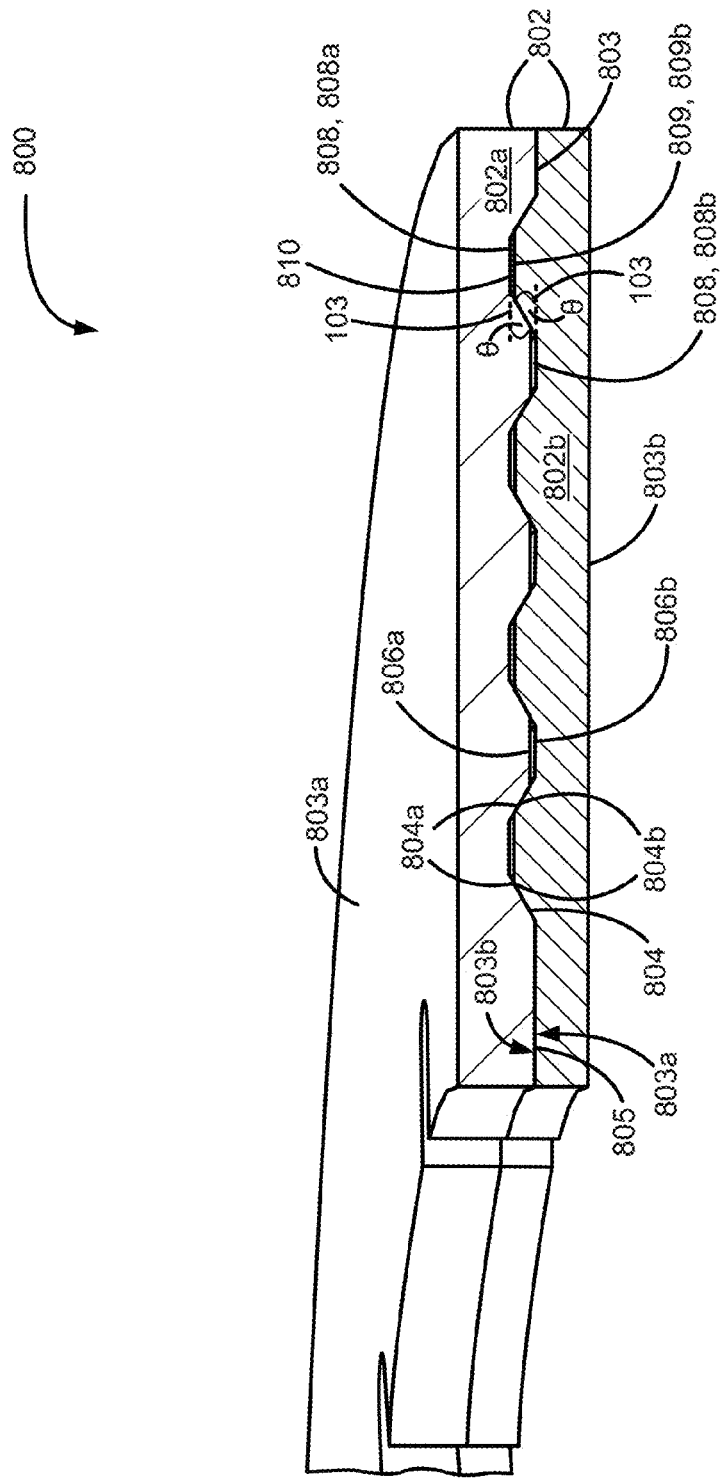
FIG. 6A illustrates a partial cut-away perspective view of two disk leaves comprising sloped contact surfaces in accordance with various embodiments.
Figure 6B:
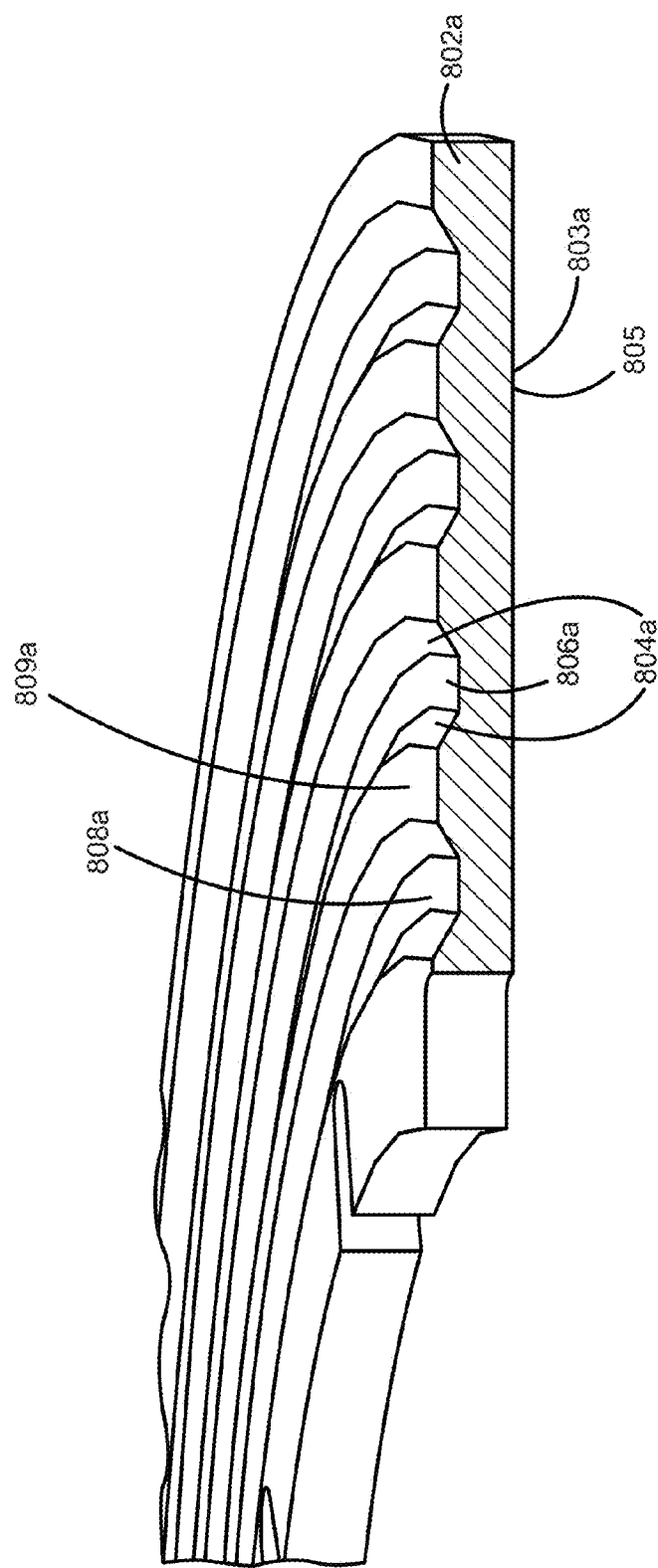
FIG. 6B is a perspective view of one of the disk leaves of FIG. 6A, showing its top surface in accordance with various embodiments.
Figure 6C:
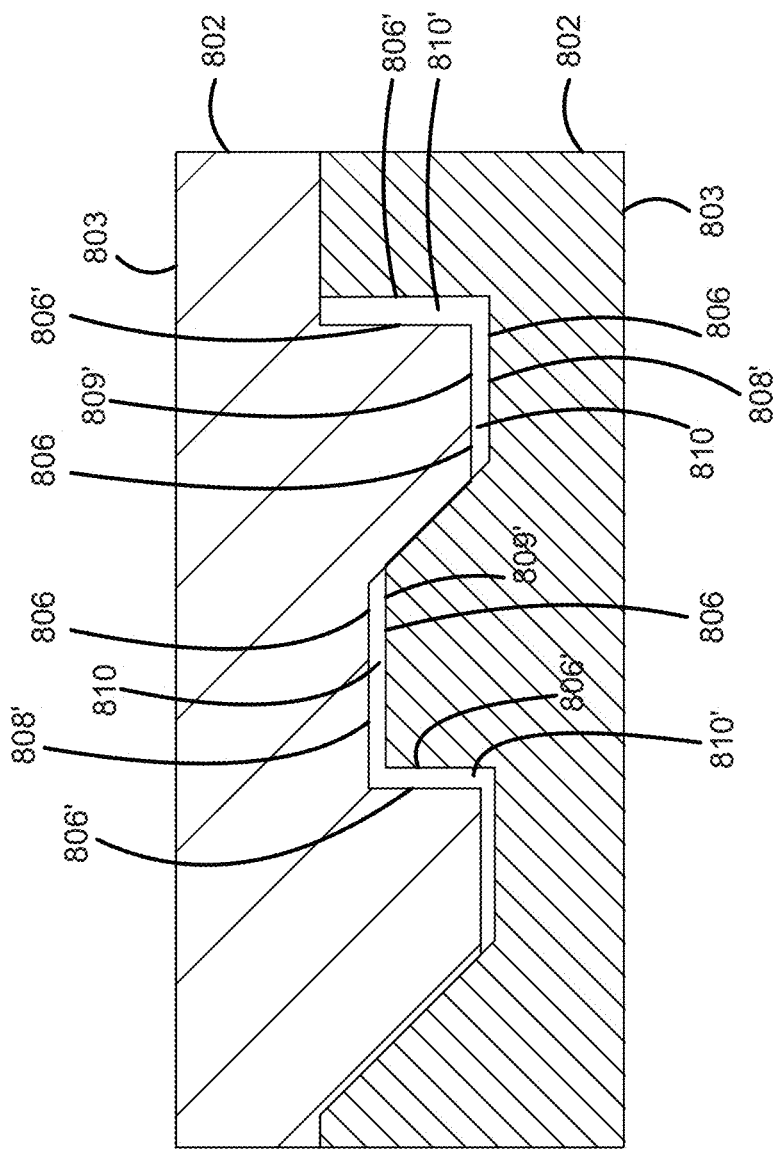
FIG. 6C illustrates a partial cut-away view of disk leaves having sloped contact surfaces and including perpendicular non-contact surfaces in accordance with various embodiments.

In various embodiments, and with reference to FIGS. 6A-C, disk brake assembly 20 may include a disk damping core 800, comprising at least two disk leaves 802, represented by disk leaf 802a and disk leaf 802b, comprising mating sloped contact surfaces 804, represented by sloped contact surface 804a and sloped contact surface 804b, on at least one of disk leaf sides 803 (represented by sides 803a and 803b), of the disk leaves 802. In various embodiments, disk leaves 802 comprise a generally planar surface component 805, perpendicular to axis 102 of disk brake assembly 20 (with momentary reference to FIG. 1), and sloped contact surfaces provide a sloped component, which is generally angled with respect to axis 102 and/or planar surface component 805. Sloped contact surfaces 804 are formed in the manufactured disks prior to usage, and configured to provide additional energy damping through disk leaves 802. According to various embodiments, disk damping core 800 may form at least a portion of multi-leaved core damping disks 90, 95. According to various embodiments, any split disk and/or friction disk mating surface of disk brake assembly 20 may form disk damping core 800 comprising mating sloped contact surfaces 804.

In various embodiments, disk leaf 802a comprises at least one sloped contact surface 804a, and disk leaf 802b comprises at least one sloped contact surface 804b, configured to contact in mating alignment with sloped contact surface 804a, wherein sloped contact surface 804a is complementary to sloped contact surface 804b. In various embodiments, sloped contact surface 804a is sloped at an angle θ relative to an axis 103 perpendicular to axis 102, and sloped contact surface 804b is sloped at a substantially similar angle θ relative to axis 103 (see FIG. 6A), both forming fixed slopes equal to one another, which are configured to contact in mating alignment, as shown. In various embodiments, θ may also be defined with respect to planar surface component 805 which is parallel to axis 103. In various embodiments, disk leaves 802a and 802b further comprise mating non-contact surfaces 806, represented by non-contact surface 806a and non-contact surface 806b, adjacent sloped contact surfaces 804. In various embodiments, disk leaf 802a comprises at least one non-contact surface 806a, and disk leaf 802b comprises at least one non-contact surface 806b, wherein a gap 810, configured to allow for compression and movement between disk leaves 802, is formed between non-contact surfaces 806a and 806b upon contact between sloped contact surfaces 804a and 804b, as shown in FIG. 6a.

In various embodiments, and with reference to FIG. 6B disk leaf 802a (shown inverted) comprises at least two of sloped contact surfaces 804a, which are inclined in opposite directions with respect to planar surface component 805, and at least one of non-contact surface 806a, which is parallel with respect to planar surface component 805, to form at least one trench 808a and/or peak 809a, having a "Belleville" or conical type structure. With reference back to FIG. 6A, disk leaf 802b similarly comprises at least two of sloped contact surfaces 804b, which are inclined with respect to planar surface component 805, and at least one non-contact surface 806b, which is parallel with respect to planar surface component 805, to form at least one trench 808b and/or peak 809b, having a belleville or conical type structure, wherein at least one trench 808a and/or peak 809a of disk leaf 802a is configured to mate with at least one peak 809b and/or trench 808b of disk leaf 802b, such that contact between sloped contact surfaces 804a and 804b forms gap 810 between non-contact surfaces 806a and 806b, as shown in FIGS. 6A and C.

In various embodiments, sloped contact surfaces 804 may be inclined at an angle θ of between 10 degrees and 45 degrees with respect to planar surface component 805. In various embodiments, sloped contact surfaces 804 may be inclined at an angle θ of 30 degrees with respect to planar surface component 805. In various embodiments, an axial span between adjacent non-contact surfaces (i.e. between the non-contact surface of adjacent trenches 808 and peaks 809) may be between 0.2 inches (0.5 cm) and 0.25 inches (0.63 cm). Thus, the axial span of the sloped contact surfaces may be at least about 0.2 inches (0.5 cm) according to various embodiments. In various embodiments, gap 810 may between about 0.06 inches (0.015 cm) and 0.1 inches (0.25 cm). In various embodiments, non-contact surfaces 806 may be about 0.05 inches (0.13 cm). However, trenches 808 and peaks 809 may be designed according to various configurations and dimensions, including non-symmetrical configurations.

In various embodiments, the non-contact surfaces 806 of the peaks 809a and 809b, may have a radial span larger than the radial span of the non-contact surfaces 806 of the trenches 808a and 808b, to achieve gap 810. However, in various embodiments, gap 810 may be achieved by other design configurations. For example, trenches 808a and 808b may be configured as triangles, with sloped rather than outer non-contact surfaces 806, while the non-contact surfaces 806 of peaks 809a and 809b may remain planar. Additionally, sloped contact surfaces forming trenches 808 and peaks 809 need not be limited to symmetrical configurations. Various configurations may further include non-contact surfaces perpendicular to planar surface component 805, as shown in FIG. 6C, for example, wherein disk leaves 802 include non-contact surfaces 806' which are perpendicular to planar surface component 805 to form a gap 810', and non-symmetrical trenches 808' and peaks 809'. It should further be understood that sloped contact surfaces, and non-contact surfaces may deviate from a linear configuration, and may be, for example curved, stepped, zig-zagged, etc. according to various embodiments.

In various embodiments, at least one trench 808a and/or at least one peak 809a may extend circumferentially at least around a portion of disk leaf 802a, and at least one trench 808b and/or at least one peak 809b may extend circumferentially at least around a portion of disk leaf 802b, wherein at least one trench 808a and/or at least one peak 809a is in mating alignment with at least one peak 809b and/or trench 808b. In various embodiments, trenches 808a and 808b and/or peaks 809a and 809b may extend around the entire circumference of disk leaves 802a and 802b, respectively. In various embodiments, trenches 808a and 808b and/or peaks 809a and 809b may be oriented according to any other desired configuration (e.g. trenches 808a and 808b and/or peaks 809a and 809b may extend radially or at any desired angle with respect to axis 102, and may extend to form a segment of any desired length, or may form as rounded dimples and projections, such as a fraustoconnnical configuration, etc.), as long as sloped contact surfaces 804a and 804b remain in a mating alignment.

In various embodiments, disk leaf 802a may comprise multiple trenches 808a and peaks 809a, and disk leaf 802b may comprise a corresponding number of multiple trenches 808a and peaks 809a. For example, disk leaf 802 may comprise four trenches 808 and four peaks 809, as shown in FIGS. 6A and B.

In various embodiments, a disk leaf 802 may include sloped contact surfaces 804 on both (opposing) sides 803 of disk leaf 802, according to various configurations. For example, trenches 808 and peaks 809 on opposing sides 803 may be staggered to maintain general constant thickness of disk leaf 802, according to various embodiments.

Figure 6D:
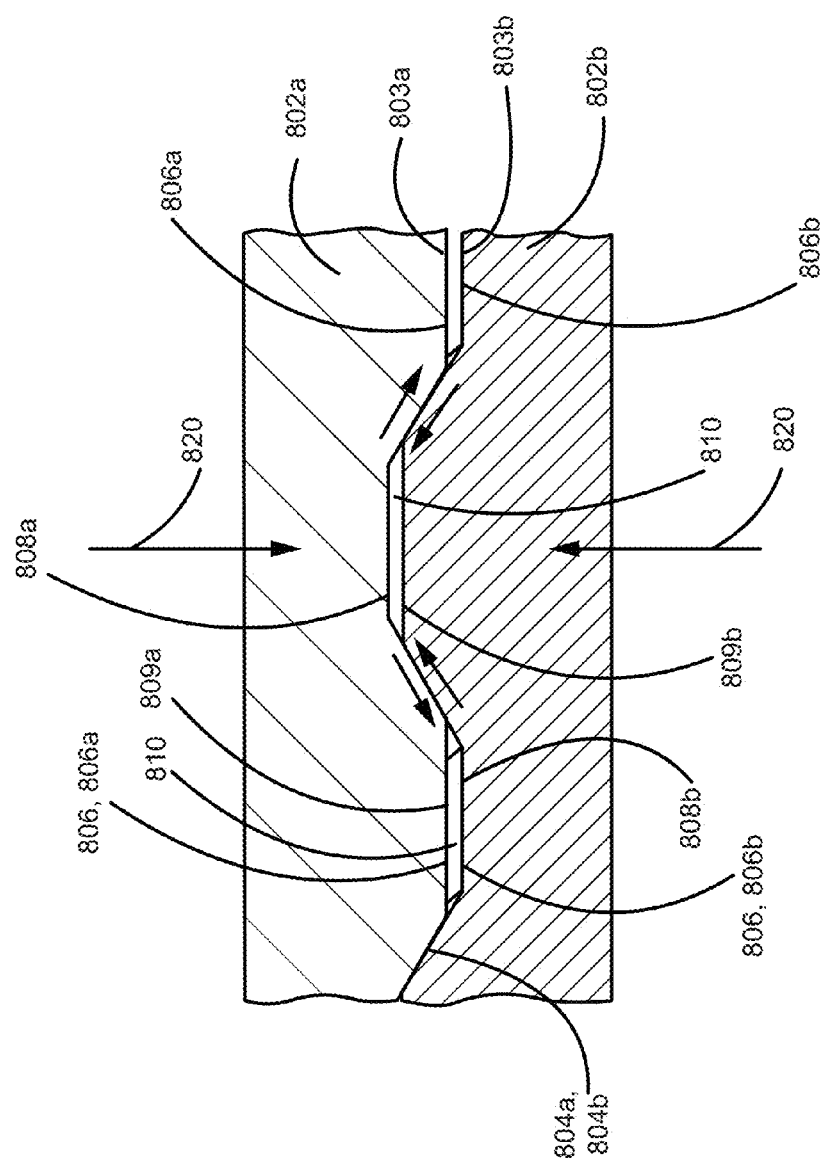
FIG. 6D is a schematic view illustrating energy translation through the disk leaves of FIG. 6A.

With reference to FIG. 6D, and without being limited in theory, it is believed that sloped contact surfaces 804, increase damping of friction, sound, and/ or vibrational energy 820 (or axial energy waves 820), by frictional dissipation and by radially translating at least a portion of the axial energy waves 820.

In various embodiments, disk damping core 800 may comprise any multiple number disk leaves 802, comprising sloped contact surfaces 804, and may be configured to replace other disks and/or split disks of disk brake assembly 20. Additionally, disk damping core 800 may form at least a portion of a multi-leaved core.

Figure 7:
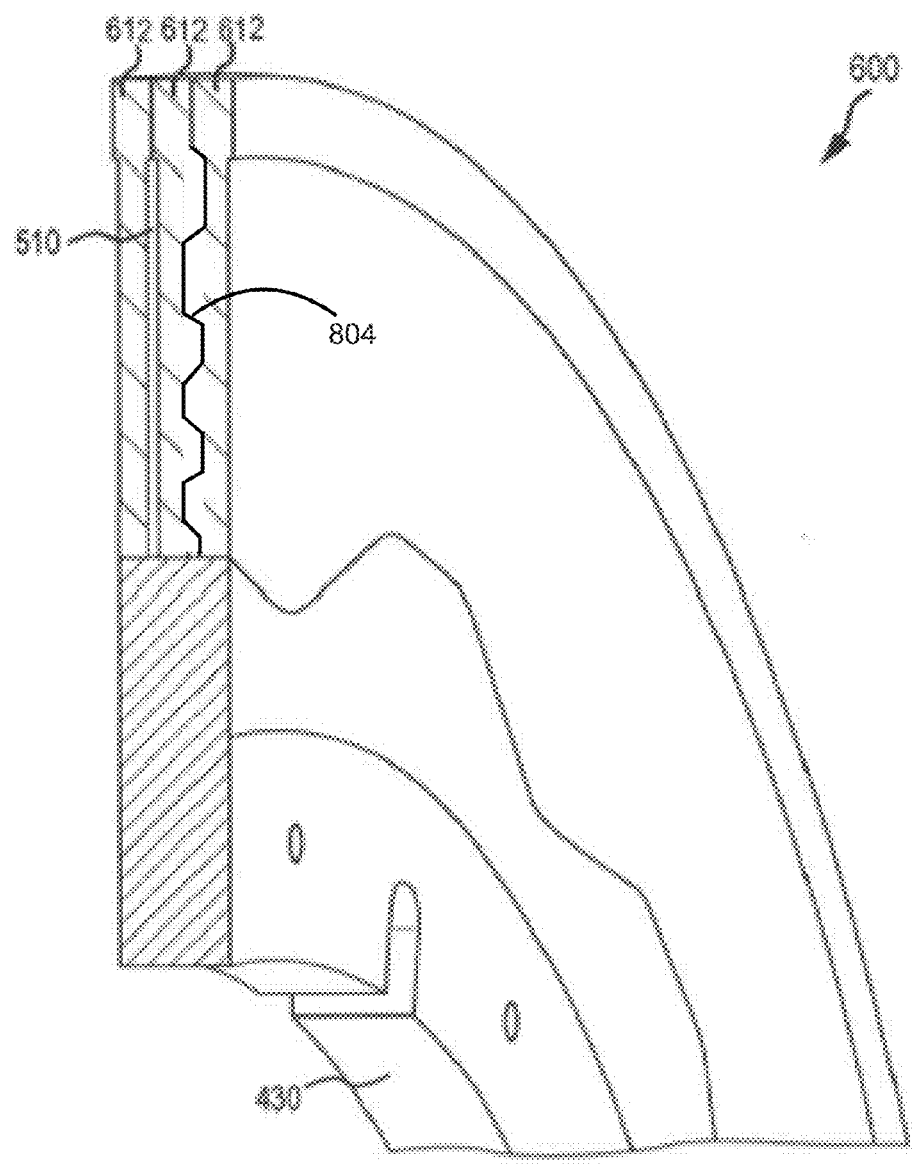
FIG. 7 illustrates a partial cut-away perspective view of a multi-leaved core in accordance with various embodiments.
Figure 8:
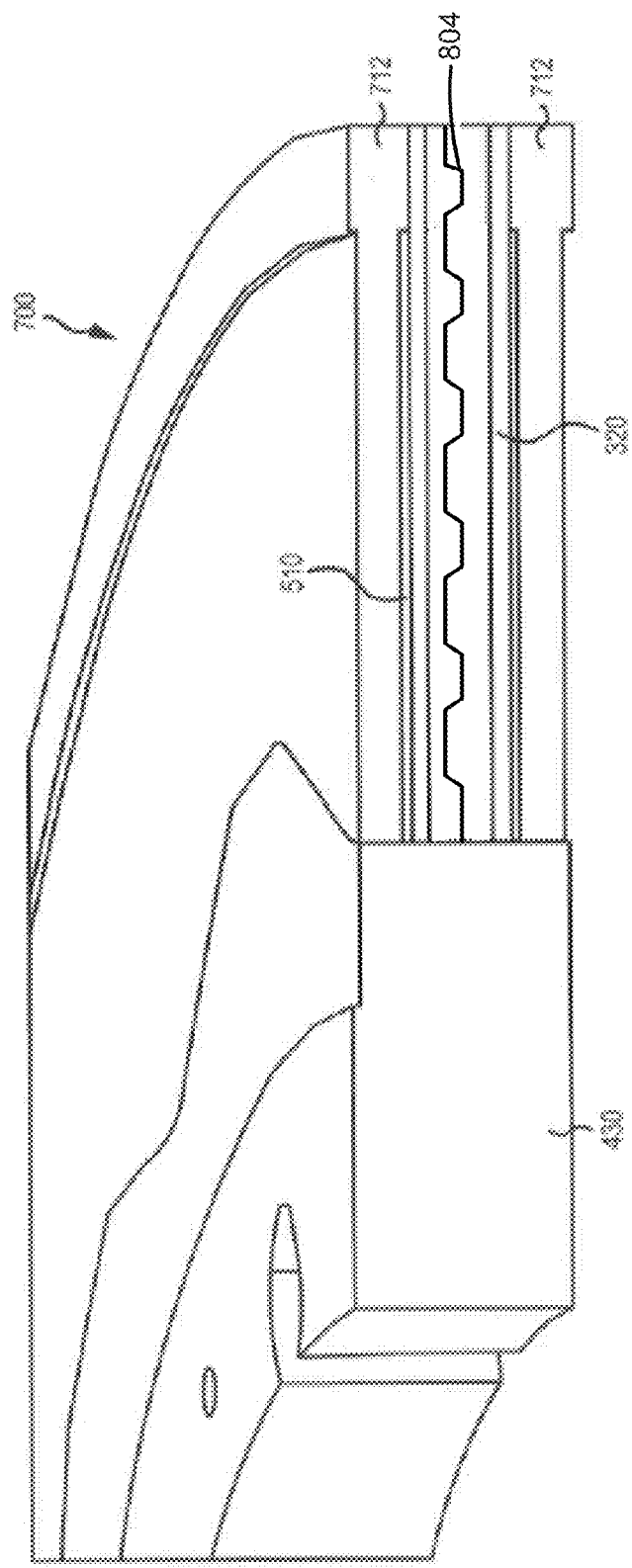
FIG. 8 illustrates an axial side view and cross-sectional views of a split friction disk half and disk assembly in accordance with various embodiments.

In various embodiments and with reference to FIG. 7, a multi-leaved core 600 may comprise a plurality of disk leaves 612, at least one cavity 510, a floating core 430, and/or at least one sloped contact surface 804. In various embodiments and with reference to FIG. 8, a multi-leaved core 700 may comprise a plurality of disk leaves 712, at least one cavity 510, a floating core 430, at least one spacer 320, and/or at least one sloped contact surface 804.

Solid friction disks may be referred to as "thick" or "thin" solid friction disks. In various embodiments, thick disks may be approximately twice as thick as thin disks. In general, a rotor (rotatable friction disk 42) comprises a thick friction disk while a stator (non-rotatable friction disk 40) comprises a thin friction disk; however, a rotor may comprise a thin friction disk while a stator may comprise a thick friction disk. As previously described, due to the high cost of the materials involved, such as the high cost of the carbon/carbon materials, reuse of materials may be important. For instance, thick friction disks may be used in the field within a braking system for a period of time, also referred to as a first tour. A thick friction disk may be removed from service and then through machining be formed into a thin friction disk. This thin friction disk may be used in the field within a braking system for a period of time, such as a second tour. This thin friction disk may be removed from service and then through machining be formed into a split thick disk and/or half of a split thick disk. This thick split friction disk may be used in the field within a braking system for a period of time, such as a third tour. The thick split friction disk may be removed from service and through machining be formed into a thin split friction disk. This thin split friction disk may be used in the field within a braking system for a period of time, such as a fourth tour. Thus, in various embodiments, a disk brake assembly which uses a variety of thin and thick and solid and split friction disks may extend the life span of the friction disks as these parts may be reused in other brake system applications, as compared with an all split disk brake assembly which may be limited to one or two tours. In various embodiments, use of multi-leaved core damping disks and/or a single "dead" disk to provide damping may improve cost efficiencies through reuse and repurposing of friction disks and carbon composite materials.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A disk damping core comprising:
   a first disk leaf having at least one first sloped contact surface and at least one first non-contact surface positioned adjacent the at least one first sloped contact surface; and
   a second disk leaf having at least one second sloped contact surface and at least one second non-contact surface positioned adjacent the at least one second sloped contact surface, the first disk leaf and the second disk leaf being configured such that a gap is formed between the at least one first non-contact surface and the at least one second non-contact surface when the at least one first sloped surface is in contact with the at least one second sloped surface,
   wherein the at least one first sloped contact surface is formed in the first disk leaf as manufactured, and wherein the at least one second sloped contact surface is formed in the second disk leaf as manufactured.

2. The disk damping core of claim 1, wherein the at least one first sloped contact surface is inclined at a first angle of between 10 degrees and 45 degrees with respect to a planar surface component of the first disk leaf, and the at least one second sloped contact surface of the second disk leaf is inclined at a second angle of between 10 degrees and 45 degrees with respect to a planar surface component of the second disk leaf, wherein the first angle equals the second angle.

3. The disk damping core of claim 1, wherein the first sloped contact surface is repeated at varying radial positions on the first disk leaf.

4. The disk damping core of claim 1, wherein the gap formed between the at least one first non-contact surface and the at least one second non-contact is between about 0.015 cm and 0.25 cm.

5. The disk damping core of claim 1, wherein the first disk leaf comprises at least two sloped contact surfaces, which are inclined in opposite directions with respect to a planar surface component of the first disk leaf, wherein the at least one first non-contact surface of the first disk leaf is parallel with respect to the planar surface component of the first disk leaf, and wherein the at least two sloped contact surfaces and the at least one first non-contact surface form at least one of a trench or peak within the first disk leaf,
   wherein the second disk leaf comprises at least two sloped contact surfaces, which are inclined in opposite directions with respect to a planar surface component of the second disk leaf, wherein the at least one second non-contact surface of the second disk leaf is parallel with respect to the planar surface component of the second disk leaf, and wherein the at least two sloped contact surfaces and the at least one non-contact surface form at least one of a trench or peak within the second disk leaf, and wherein the at least one of a trench or peak within the first disk leaf is configured to at least partially contact in mating alignment with at least one of a trench or peak within the second disk leaf.

6. The disk damping core of claim 5, wherein the at least one of a trench or peak within the first disk leaf extend circumferentially at least around a portion of the first disk leaf.

7. The disk damping core of claim 5, the first disk leaf comprising at least one trench and at least one peak, the second disk leaf comprising at least one trench and at least one peak, wherein the at least one trench of the first disk leaf is in mating alignment with the at least one peak of the second disk leaf, and wherein the at least one peak of the first disk leaf is in mating alignment with the at least one peak of the second disk leaf.

8. The disk damping core of claim 5, the first disk leaf comprising multiple trenches and multiple peaks, and the second disk leaf comprising multiple trenches and multiple peaks.

9. The disk damping core of claim 1, wherein the at least two disk leaves comprise a carbon composite material.

10. A disk brake assembly comprising:
    a pressure plate coupled to a first rotor friction disk of a plurality of rotor friction disks; and
    a plurality of stator friction disks located between the pressure plate and an end plate,
      wherein at least one stator friction disk comprises a disk damping core wherein the disk damping core comprises a plurality of disk leaves wherein the plurality of disk leaves comprises a first disk leaf and a second disk leaf, the first disk leaf having at least one first sloped contact surface formed in the first disk leaf as manufactured, and the second disk leaf having at least one second sloped contact surface formed in the second disk leaf as manufactured, wherein at least one cavity formed between the plurality of disk leaves, and at least one spacer is disposed between the plurality of disk leaves.

11. The disk brake assembly of claim 10 wherein each one of the plurality of stator friction disks is disposed alternately with each one of the plurality of rotor friction disks along an axis, and wherein at least one of the plurality of rotor friction disks and the plurality of stator friction disks comprises a solid friction disk, and wherein the end plate is coupled to a second rotor friction disk of the plurality of rotor friction disks.

12. The disk brake assembly of claim 10, wherein the disk damping core further comprises a floating core.

13. The disk brake assembly of claim 10, the disk damping core further comprising at least one non-contact surface adjacent the at least one first sloped contact surface of the first disk leaf; and at least one non-contact surface adjacent the at least one second sloped contact surface of the second disk leaf, wherein contact between the at least one first sloped contact surface of the first disk leaf and the at least one second sloped contact surface of the second disk leaf creates a gap between the at least one non-contact surface of the first disk leaf and the at least one non-contact surface of the second disk leaf.

14. A multi-leaved core damping disk comprising:
    a first disk half having a first friction surface at a first axial end of the first disk half and a first non-friction surface at a second axial end of the first disk half;
    a second disk half having a second friction surface at a third axial end of the second disk half and a second non-friction surface at a fourth axial end of the second disk half, wherein the first friction surface is disposed at a fifth axial end of the multi-leaved core damping disk and the second friction surface is disposed at a sixth axial end of the multi-leaved core damping disk; and
    a multi-leaved core disposed between, and axially aligned with, the first disk half and the second disk half, the multi-leaved core comprising at least two disk leaves comprising a first disk leaf and a second disk leaf;
    the first disk leaf comprising at least one first sloped contact surface and at least one first non-contact surface positioned adjacent the at least one first sloped contact surface; and the second disk leaf comprising at least one second sloped contact surface and at least one second non-contact surface positioned adjacent the at least one second sloped contact surface, the first disk leaf and the second disk leaf being configured such that a gap is formed between the at least one first non-contact surface and the at least one second non-contact surface when the at least one first sloped surface is in contact with the at least one second sloped surface, wherein the at least one first sloped contact surface is formed in the first disk leaf as manufactured, and wherein the at least one second sloped contact surface is formed in the second disk leaf as manufactured.

15. The multi-leaved core damping disk of claim 14, wherein the at least one first non-contact surface of the first disk leaf is perpendicular to an axis of the multi-leaved core.

16. The multi-leaved core damping disk of claim 14, wherein the at least one first non-contact surface of the first disk leaf is parallel to an axis of the multi-leaved core.

17. The multi-leaved core damping disk of claim 16, wherein the first disk leaf comprises at least two sloped contact surfaces, which are inclined in opposite directions with respect to a planar surface component of the first disk leaf, the planar surface component being perpendicular to an axis of the multi leaved core, wherein the at least one first non-contact surface of the first disk leaf is parallel with respect to the planar surface component of the first disk leaf, and wherein the at least two sloped contact surfaces and the at least one first non-contact surface form at least one of a trench or peak within the first disk leaf, wherein the second disk leaf comprises at least two sloped contact surfaces, which are inclined in opposite directions with respect to the planar surface component of the first disk leaf, wherein the at least one second non-contact surface of the second disk leaf is parallel with respect to the planar surface component of the first disk leaf, and wherein the at least two sloped contact surfaces and the at least one second non-contact surface form at least one of a trench or peak within the second disk leaf, and wherein the at least one of a trench or peak within the first disk leaf is configured to mate with at least one of a trench or peak within the second disk leaf.

18. The multi-leaved core damping disk of claim 14, wherein at least one of the first disk leaf and the second disk leaf comprise a carbon composite material.

* * * * *